Sept. 15, 1959 G. A. DIEHL 2,904,200

SHUTTLE-LIFT DEVICE FOR USE IN PARKING AUTOMOBILES

Filed Aug. 29, 1958 7 Sheets-Sheet 1

GLENN A. DIEHL
*INVENTOR.*

BY Smith & Tuck

Sept. 15, 1959 G. A. DIEHL 2,904,200

SHUTTLE-LIFT DEVICE FOR USE IN PARKING AUTOMOBILES

Filed Aug. 29, 1958 7 Sheets-Sheet 2

INVENTOR.
GLENN A. DIEHL
BY
Smith & Tuck

Sept. 15, 1959 G. A. DIEHL 2,904,200

SHUTTLE-LIFT DEVICE FOR USE IN PARKING AUTOMOBILES

Filed Aug. 29, 1958 7 Sheets-Sheet 3

GLENN A. DIEHL
*INVENTOR.*

*BY* Smith & Tuck

GLENN A. DIEHL
*INVENTOR.*

BY Smith & Tuck

SHUTTLE-LIFT DEVICE FOR USE IN PARKING AUTOMOBILES

Filed Aug. 29, 1958 7 Sheets-Sheet 5

GLENN A. DIEHL
INVENTOR.
BY Smith & Tuck

INVENTOR.
GLENN A. DIEHL
BY
Smith & Tuck

GLENN A. DIEHL
INVENTOR.

BY Smith & Tuck

United States Patent Office 2,904,200

Patented Sept. 15, 1959

2,904,200

SHUTTLE-LIFT DEVICE FOR USE IN PARKING AUTOMOBILES

Glenn A. Diehl, Seattle, Wash., assignor to Rota Parking, Inc., Seattle, Wash., a corporation of Washington Application August 29, 1958, Serial No. 757,893

6 Claims. (Cl. 214—392)

This present invention relates to the general art of automobile parking devices and more particularly to a device intended for the limited transporting of automobiles in congested parking areas, which is arranged to lift an automobile bodily and carry it over other parked automobiles, where the device may deposit it in a blank space in a parking area. To achieve its end result, the device is provided with a framework having four dependent pedestal-like legs, each of which is equipped with a pair of power driven wheels so that by selection of one set of four wheels, one at each corner of the device, the unit and its load may be moved longitudinally or, if it is necessary the alternate set of wheels may be employed to move the car transversely of its axis.

The parking of automobiles in metropolitan areas has become a major transportation problem. One effect of the parking problem has been to decentralize business activity, which has had a most adverse effect on established values of buildings and properties in the more congested areas. Cities have been gradually developed as a great convenience in the centralization of many activities so that they could be within easy call of each other and as a result many studies are now being made in an endeavor to find a real solution of the automobile parking problem.

This present device may be employed to provide a high density of parking so that the ground area will be fully utilized and further provide means so that when an owner wants his car it can be delivered to him in a minimum of time and without moving any of the various other cars, that may have been parked in the row ahead of his. This device is also very useful in implementing other forms of mechanical parking as for instance the type of parking illustrated in the copending application, Serial No. 623,930. In this instance, it provides means for selecting any desired car from the parking area with the minimum mechanical movement of the various other parked cars. One of the greatest problems in various mechanical parking devices is that when a high density of parking is provided it often becomes quite a problem to deliver cars out of the order in which they were received since it is very difficult for car owners to tell exactly when they will want delivery of their cars. This present device provides an excellent solution of this perplexing problem.

A principal object of this present invention therefore is to provide a car handling device, which has the capacity for straddling a car and lifting it within the area of the four corners of the device to an elevation permitting it to be carried over other parked automobiles to be either delivered to its owner or taken into the parking area where parking space is available.

A further object is to provide means for moving the parking device longitudinally and transversely of its axis so that it can cover a wide area effectively.

A further object of this invention is to provide roller engagement of the automobile tires so that it can be moved on its own wheels, even though the car itself is locked, and when moved to the new location it can be stopped by the roller arrangement.

A further object of this invention is to provide movable sets of rollers so that the rollers necessary for the engagement of the four wheels of the automobile can be adjusted to accurately match the wheel base of the automobile to be moved.

A further object of this invention is to provide means whereby an automobile can be lifted off the ground, for movement to any degree desired.

Further objects, advantages and capabilities will be apparent from the description and disclosure in the drawings, or may be comprehended or are inherent in the device.

Figure 1:
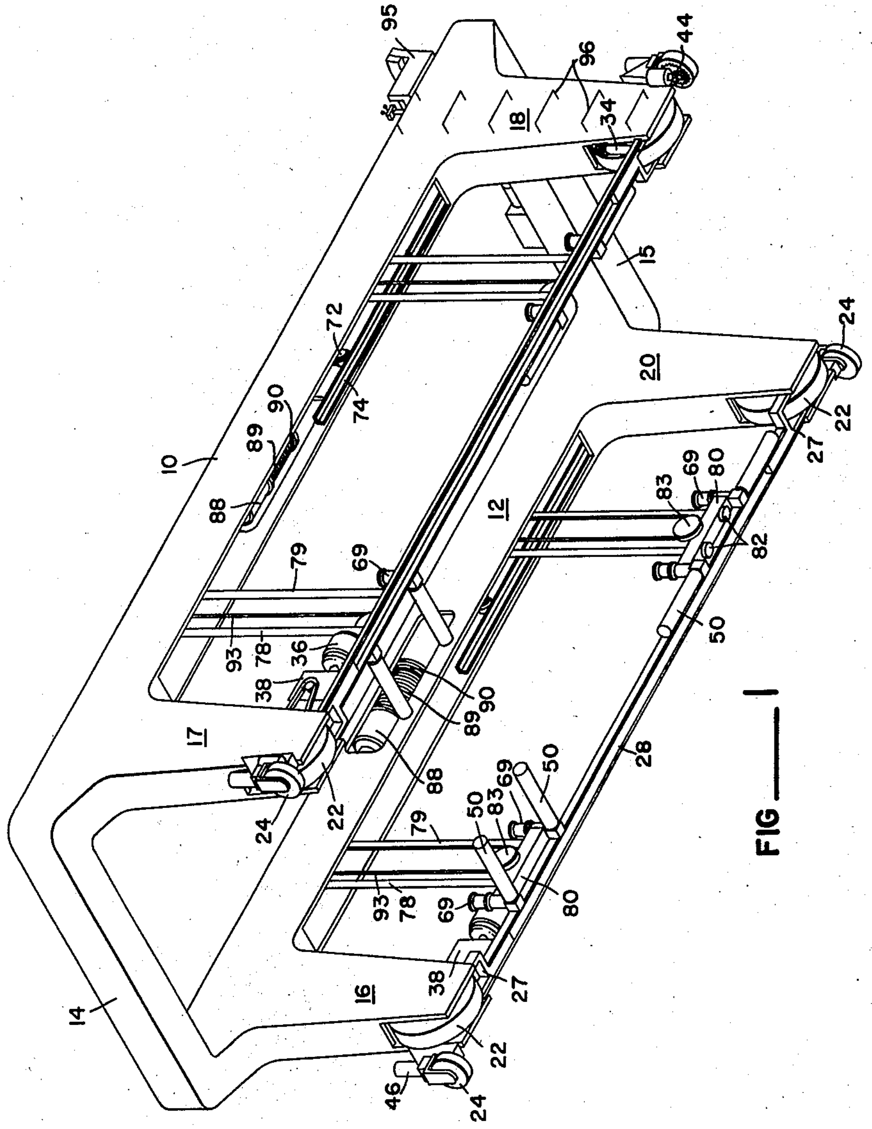
Figure 1 is a perspective view of this present shuttle-lift device as viewed diagonally from underneath the device.

Referring to the drawings, throughout which like reference indicate like parts, this present parking device is constructed as an open box type framework having the parallel side members 10 and 12 and the joining end members 14 and 15. The framework is preferably built of plates in a hollow form so as to enclose as much of the operating mechanism as possible, consistent with good design. Adjacent each of the four corners, downwardly directed legs are provided as indicated at 16, 17, 18 and 20. The legs are of sufficient length so that the lower portion of the end frame members 14 and 15 will be high enough above the supporting ground or pavement surface so that an automobile of the highest type will be cleared by the end portions as the parking device passes over the automobile. Each of the legs is provided with power driven transport wheels 22, which are disposed with the plane of the wheels parallel to the longitudinal axis of the main framework of the device. In order to move the device transversely of its longitudinal axis, as is often desirable, auxiliary wheels 24 are provided, one at each corner of the device and with the plane of these wheels parallel to a transverse axis through the main framework of the shuttle-lift or parking device.

The exact manner of driving these two sets of wheels, namely wheels 22 for longitudinal movement of the device and wheels 24 for a transverse movement and the tires employed with the same, will be influenced by site conditions. A preferred form appears to be one in which the main traction wheels are designed for longitudinal movement of the device and these will be the ones normally used rather than the transverse movement wheels 24. Wheels 22 are preferably provided with pneumatic tires of the order of heavy duty tires as employed on trucks and the like, and these are mounted on an axle 26 capable of limited vertical movement as by the curved lever 27 pivoted to the lower frame 28 of the shuttle-lift device as at 30. The legs are preferably slotted as at 31 to give access to and a working channel for the ends of axle 26 and the securing means therefor. Spring suspension means is provided at 32. This spring is suitably housed in the two part telescoping housing 33 and 34 so that the deight of the shuttle-lift or parking device is carried upon four springs 32 through four pivoted levers 27. This arrangement relieves the framework of the parking device of any twisting strain that might be experienced in going over uneven ground. The propulsion drive for wheels 32 is provided by the electric motor 36 having a reduction gear at 38, the output of which provides the driving sprocket 39 for the driving chain 40. This driving chain is adapted to drive sprocket 42 which is fixedly secured to wheel 22. Reversing means is provided, preferably by the employment of a direct reversing motor 36.

Figures 2, 3, 4:
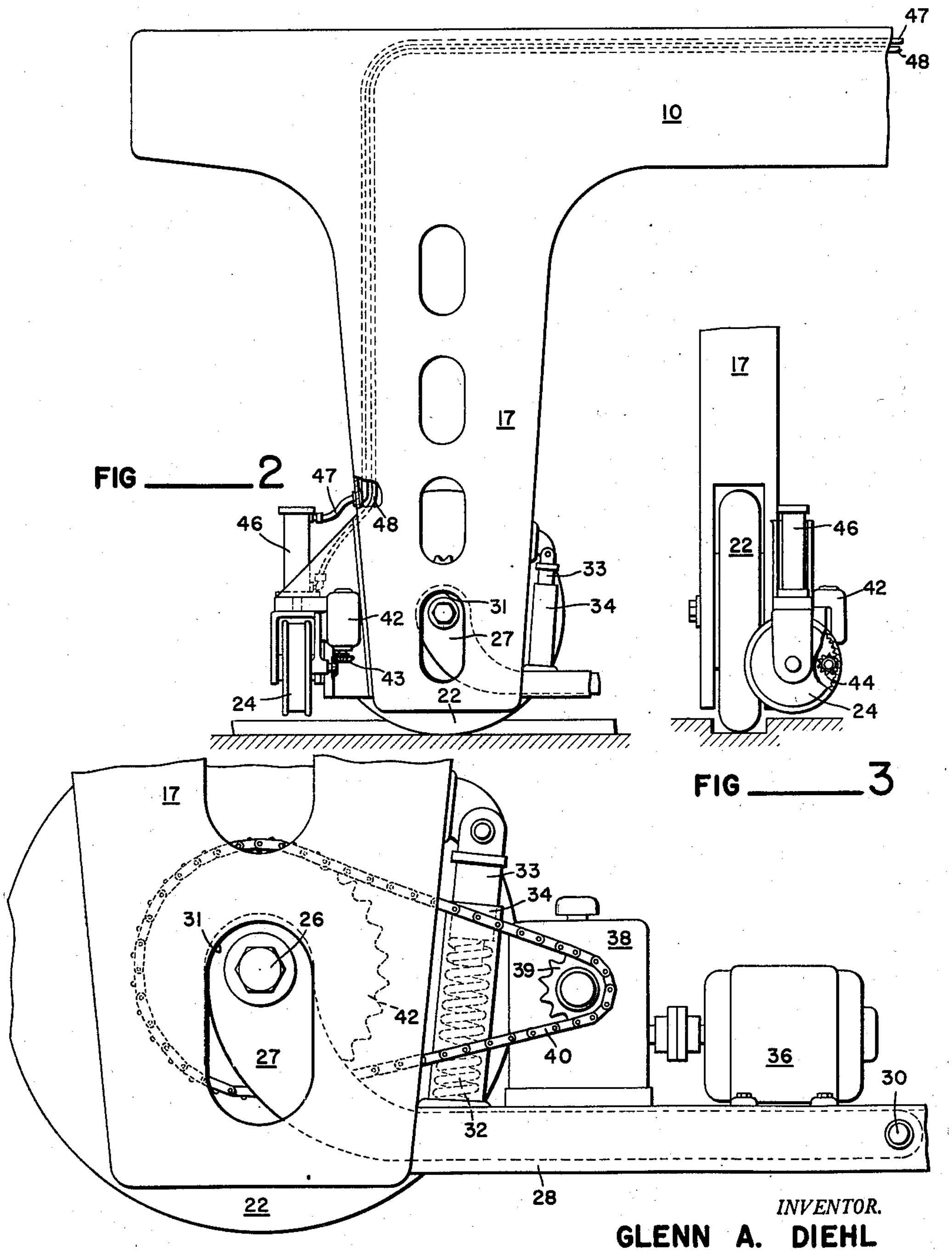
Figure 2 is an elevation showing a typical corner of the lifting device, viewed from the side.
Figure 3 is a fragmentary end view of the corner pedestal.
Figure 4 is a fragmentary view illustrating a portion of the lower part of the corner pedestal illustrating more fully the drive and supporting means therefor.
Figure 5:
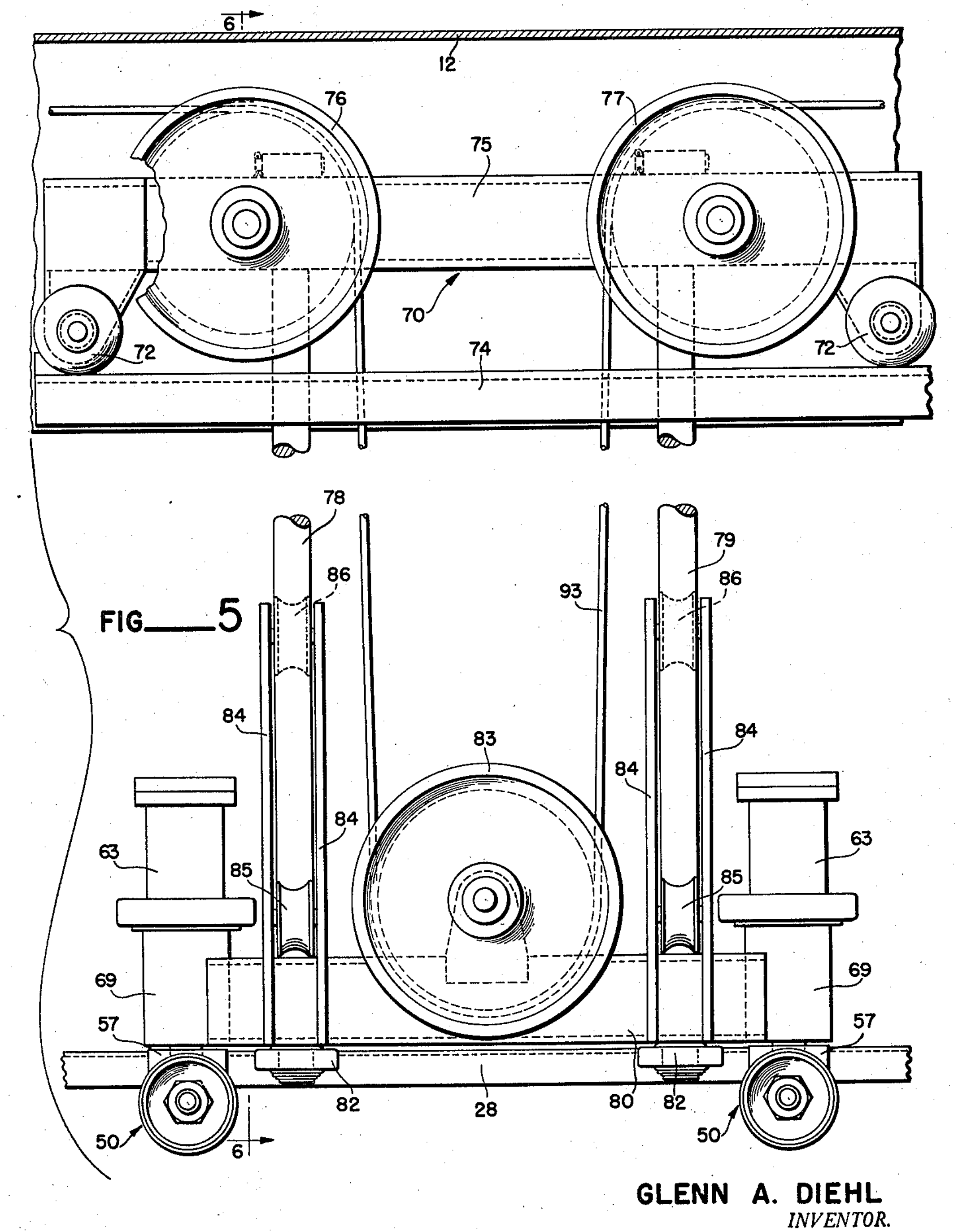
Figure 5 is a side elevation partly broken away illustrating the adjustable roller assembly together with the vertical guides required when the rollers are lifting a car.

To move the parking device transversely, wheels 24 are provided, one at each leg of the device, and the tire for this wheel will again be a matter of site consideration. It may be a flanged wheel, as indicated in Figure 2 or with suitable guiding provisions in a trough or similar arrangement, a pneumatic tire might be employed. It is to be noted tha in Figure 2 a raised guide is provided for wheels 22 whereas is Figure 3 a depressed guideway is shown as though formed in the pavement of the parking lot. Wheels 24 are each provided with individual drive means preferably employing a reversing electric motor 42 driving through beveled gears, as 43, to an internal gear drive indicated in Figure 3 at 44. Each of wheels 24 is preferably provided with a fluid cylinder 46 of the double acting type so that wheels 24 can be lowered and, when on a solid base, a continued introduction of fluid will raise wheels 22 from driving contact and make it possible to obtain the transverse movement of the parking device. The sets of fluid circulating lines 47 and 48 are preferably all under a single control and the fluid under pressure supplied from a single source to simplify control.

Throughout the drawings the general arrangement of wheels 24 and 22 has been somewhat exaggerated in scale but it is desirable to point out that the transverse extent of all the equipment housed in the legs and the legs themselves should be kept to a minimum so that the alley way between rows of parked cars can in turn be kept as narrow as possible. Otherwise a portion of the advantage of the device is lost in the wastage of ground space.

Figure 6:
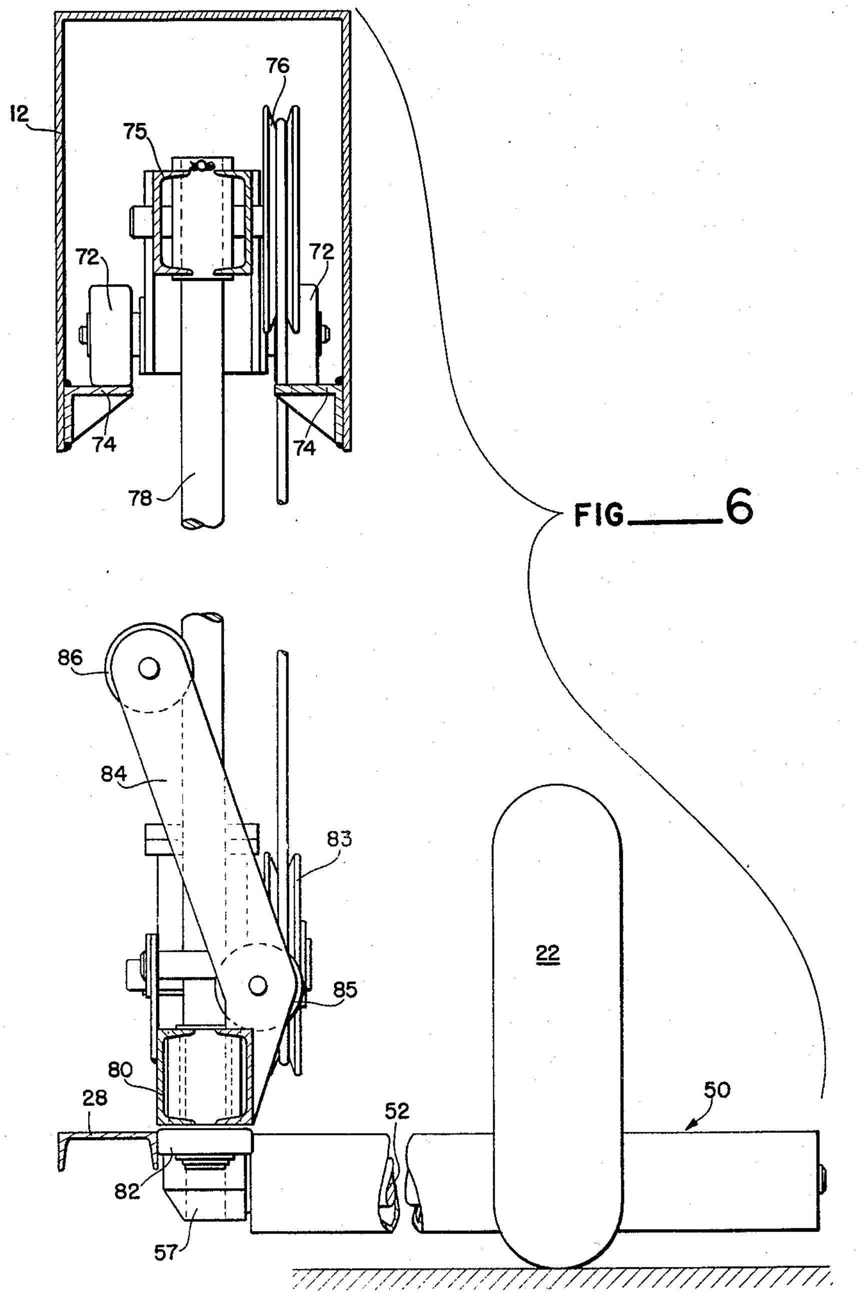
Figure 6 is a bracketed broken sectional view taken substantially along the line 6—6 of Figure 5 and illustrating the roller assembly and the guide means therefor as illustrated also in Figure 5. An automobile tire is shown in position to be engaged by the extended roller.

In order to move an automobile under control, I provide a pair of rollers to engage the front and rear portions of each tire below the supporting axle of the tire. This equipment is probably best illustrated in Figures 1, 6, 7, 8 and 9. The roller 50 itself (referring now to Figure 7) is provided with a supporting spindle 52 about which it revolves. Antifriction bearings are provided at 53 and 54 upon which a preferably metal roller facing tube 55 is revolvably supported. An acceptable proportion between the diameter of tube 55 and the conventional tire is illustrated quite well in Figure 6, together with the preferred elevation of engagement of the rollers with the tire. It is desirable to have the over-all width of the shuttle-lift device kept to a minimum in order that fullest advantage be taken of the available parking area. However, automobiles are of varying tread widths and varying over-all widths. Consequently the legs of the machine, as 16 through 20, must be spaced far enough apart to accommodate the largest vehicle to be parked. On the other hand, we have many cars of narrow width, particularly, the so-called small cars as exemplified by the foreign cars imported into this country, and therefore the length of rollers 50 will be a function of the spread transversely of the legs of the device and the tread width of the car having the narrowest tread.

In order to drive an automobile into the shuttle-lift device or to pass the device over a car, the rollers must be retracted to a position well outside the vertical projection of the car. This requires swinging the rollers through a horizontal arc of 90 degrees so that they will be out of the roadway as the car is brought into the shuttle-lift device and can then be brought into engagement with the tires after the car is in place. It is, too, pointed out that it is not necessary to have tight engagement of the rollers that are disposed in front of and in rear of the tire. Only the pushing rollers will be actually in contact and the function of the coacting roller is only to arrest the movement of the car, or to make it possible to reverse the direction of movement.

Figures 7, 8, 9:
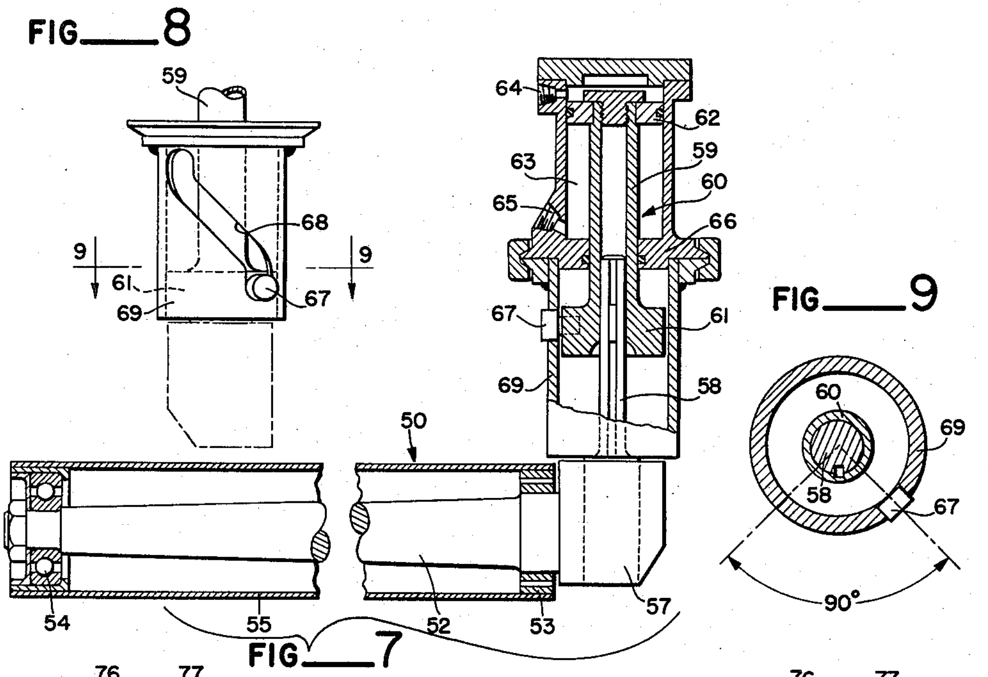
Figure 7 illustrates in a vertical sectional view one of the car moving rollers together with certain of its actuating mechanism.
Figure 8 illustrates in elevation a lower portion of the pedestal member of Figure 7 and illustrates the slot-cam arrangement that effects the positioning of the roller in its horizontal plane.
Figure 9 is a cross-sectional view taken along the line 9—9 of Figure 8.

Referring to Figure 7, spindle 52 is provided with a knuckle unit 57, which in turn accepts in a fixed relationship the splined or keyed shaft 58. Disposed around shaft 58, and in a manner so that it may move up and down with respect to shaft 58 without any angular slippage between the two, is an actuating piston assembly 60. Piston assembly 60 is provided with a guide or crosshead means at its lower end, as at 61, and a piston 62 preferably provided with fluid retaining piston rings joined together by a hollow quill 59. A suitable fluid cylinder assembly is provided at 63 having the two fluid ports 64 and 65 so that piston 62 can function as a double acting piston and a fluid sealing base 66. Ports 64 and 65 are connected to suitable fluid pressure lines. Guide maens 61 is provided with a stud retained roller follower 64, which is adapted to follow thec am groove 68 provided in guide housing member 69, housing member 69 being fixedly secured against rotation. It is believed it will be apparent that as roller 67 is propelled up and down within the limits of cam groove 68, piston assembly quill 59 will be revolved, carrying with it the shaft 58, knuckle 57 and spindle 52, which supports roller 50. Groove 68 is provided with vertical portions at each end so that roller 67 will, in effect, be locked in position at each end of its travel, depending on whether the rollers are parallel to the longitudinal axis of the shuttle-lift device or whether thye are transversely disposed as in moving an automobile.

Rollers 50 have two functions, one to move and stop a vehicle on a level floor and the second to provide a secure means for engaging the four wheels of the automobile by the eight rollers in a manner so that the automobile may be raised and held in the raised position during its period of transportation to a parking position, or in the retrieving of the same from that position.

Figure 10:
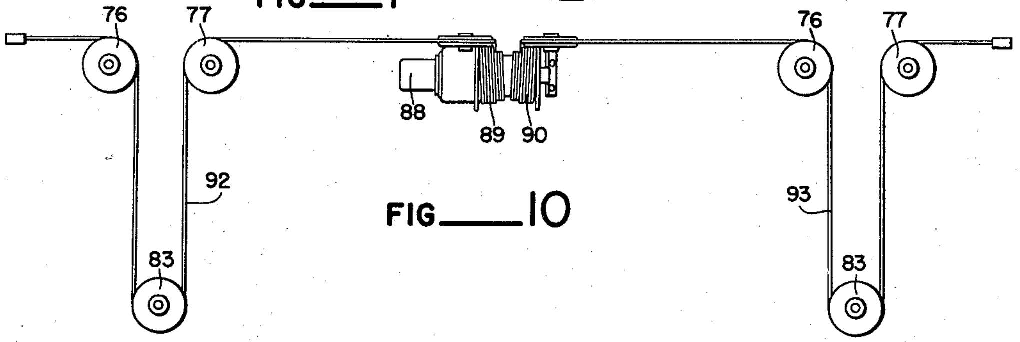
Figure 10 illustrates in simplified form the cable-lift for the roller assembly on one side of this car lifting device.
Figure 12:
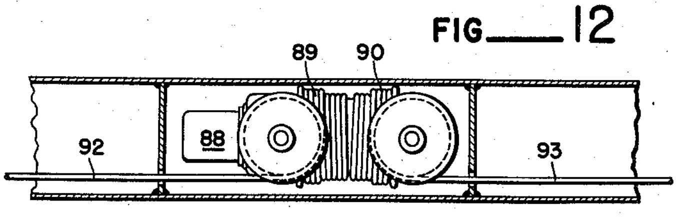
Figure 12 illustrates in sectional view taken along line 12—12 of Figure 11 and showing the car lifting motor drive and spooling reels as viewed from the top with the enclosing girder broken away and sectioned.
Figure 11:
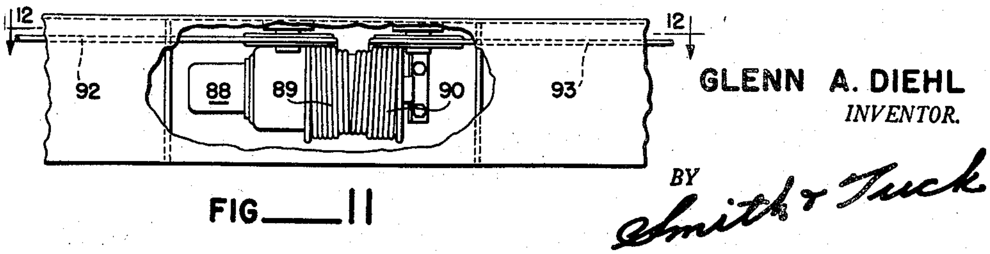
Figure 11 is a view of the car lifting motor drive and showing the same as broken away and viewed from the side to show the drive means in elevation.
Figures 13, 14:
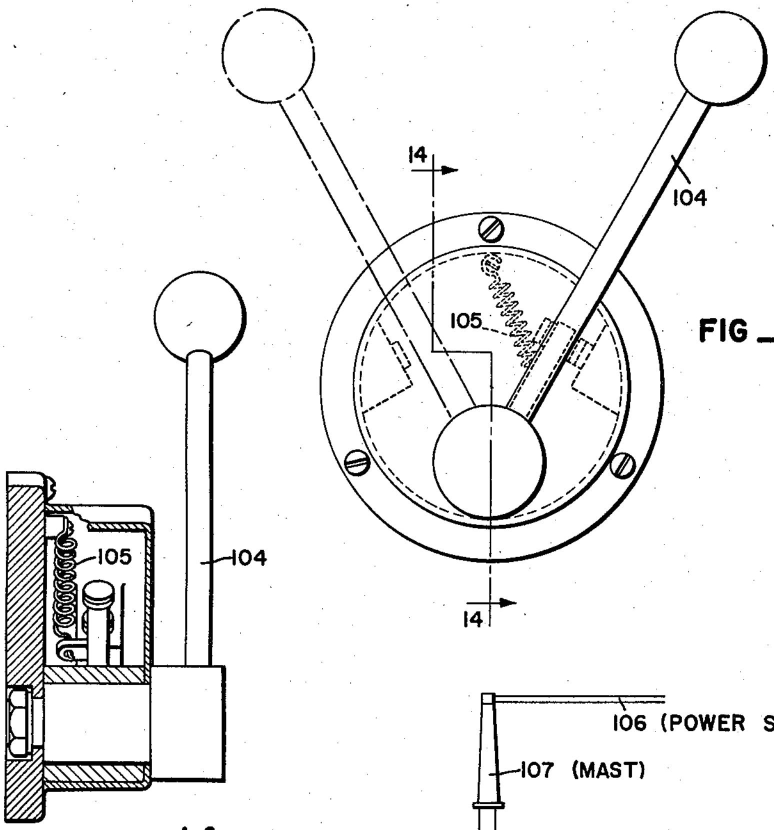
Figure 13 illustrates in elevation a preferred form of control lever, one extreme position being shown in full lines and the other extreme in dashed line.
Figure 14 is a cross sectional view along the line 14—14 of Figure 13.
Figure 15:
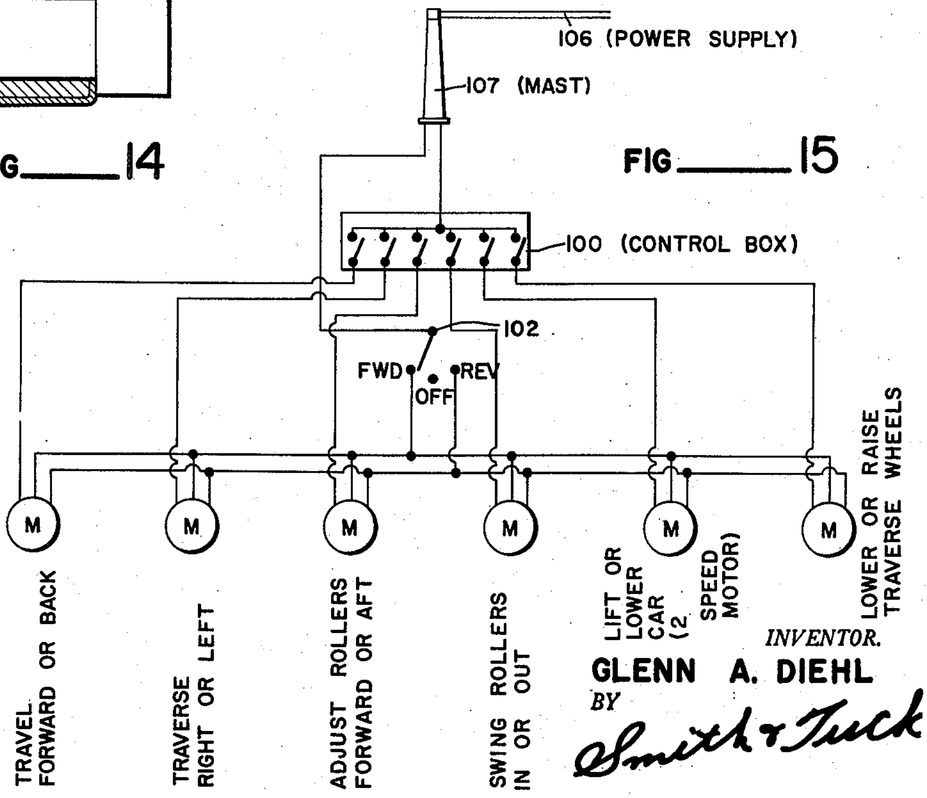
Figure 15 is a schematic electrical diagram showing the main motor circuits to the motors effecting the various movements of this shuttle lift device.

Reference is now made to Figures 1, 5, 6, 10, 11 and 12. The two rollers, rollers 50 and their coacting positioning means is duplicated four times, once for each wheel engaging assembly and it is therefore necessary to provide elevator means, which will cause these four assemblies to raise or lower as a unit, so that they can be employed to raise a single automobile and keep it on a level plane by engagement of the four tires. At least two sets of wheel engaging means, which are in transverse alignment with respect to the shuttle-lift device framework, must be capable of being adjustably positioned longitudinally of the framework in order to adjust the lifting and handling means to the various wheel bases of different makes and models of automobiles. A preferred arrangement of this device consists in having an upper carriage 70 disposed to be supported by wheels 72, from trackage 74 secured to the upper portion of the shuttle-lift framework and disposed for operation longitudinally of the same by suitable hydraulic or cable means not shown. Wheels 72, through suitable bracket means, support a cross frame member 75, to which spaced sheaves 76 and 77 are revolvably secured. Also secured to frame 75 are vertical guides as the shafts shown at 78 and 79. These shafts are slidably engaged to lower frame member 80 and are in turn guided by guide rolls 82, which engage a lower frame member as 28 of the shuttle-lift device. Frame member 80 supports a vertically movable cable sheave 83 and also the coacting pairs of roller brackets 84. Brackets 84 in turn revolvably support and position the guide engaging sheaves 85 and 86. The guide rollers provide means with a minimum of friction for accurately guiding the lower carriage of which frame 80 is a component and to which rollers 50 of each coacting pair are secured. This is an essential condition in that four of these units must safely position an automobile and raise and lower it with no connection to the car except by engagement with the tires thereof. The elevating means for each of the roller assemblies is illustrated in Figure 10 in which an elevator electric motor 88 is employed to drive two cable spools 89 and 90. This arrangement provides the two separate elevator cables 92 and 93 for each side of the device. Each motor 88 drives the two car lifts disposed on one side of the shuttle-lift framework.

The operator is provided with an elevated seat 95 which is reached by ladder 96.

Figures 16, 17:
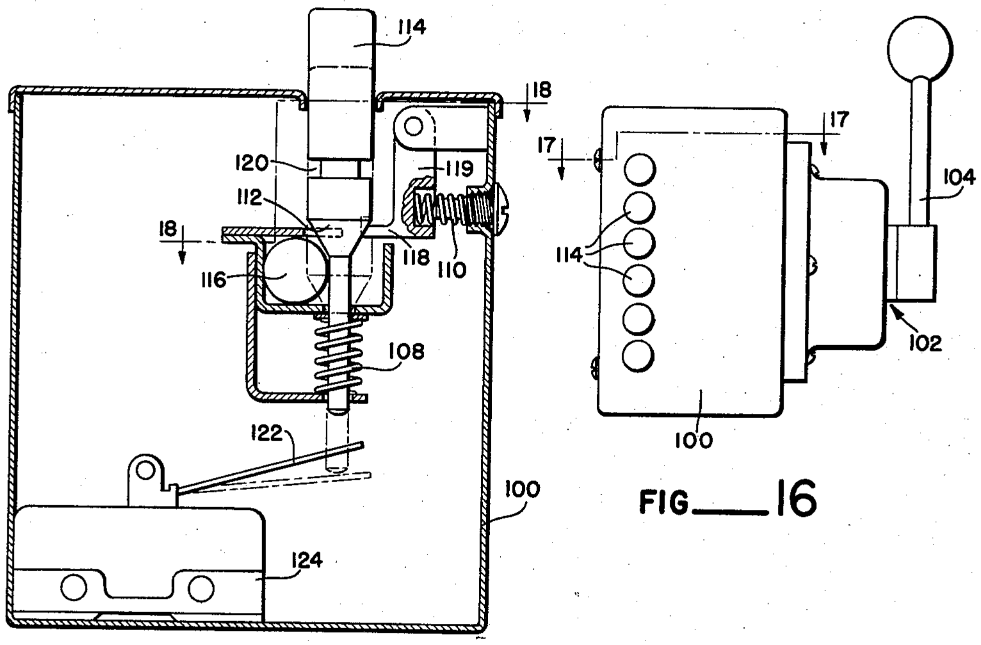
Figure 16 is a top plan view of the control device and illustrating the push button selector arrangement.
Figure 17 is a cross sectional view taken along the line 17—17 of Figure 16 and showing in vertical sectional view the electrical switching means employed.
Figure 18:
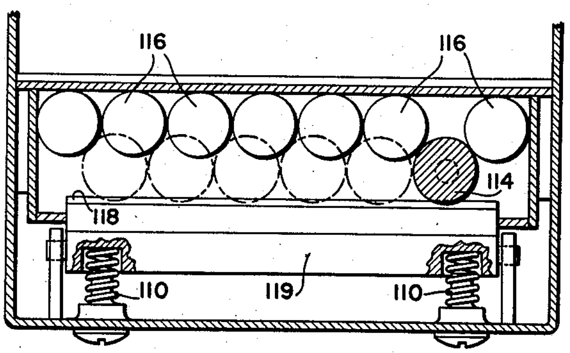
Figure 18 is a cross-sectional view taken along the broken line 18—18 of Figure 17.

Control of the entire shuttle-lift is centered in control box 100. This box carries a group of six buttons. Each button controls one particular phase of the shuttle-lift movement. These buttons are arranged in such a way that only one button can be effective at any one time. A main reversing switch 102 is shown mounted on the side of control box 100. The reversing switch has three positions, forward, reverse and off. With this control box, only one motion at a time is possible. Thus damage, caused by the operator having too many things to watch at one time, is prevented. Also, the control is simplified into one lever, 104. The switch used for this control is of the momentary-contact type, whereby the operator must hold the switch in either forward or reverse. The moment the lever is released, spring 105 returns it to the center or off position. Of the six control keys and their relays mentioned above, each connect the main power cable 106 through mast 107 with each of the respective drive unit circuits. The unique method of interlocking is shown in Figures 17 and 18. When a key is depressed against spring 108 and 110, the cone-shaped portion 112 of the key 114 wedges between two adjacent steel balls 116, taking up all space in the ball track. At the bottom of the key stroke, the detent bar 118 on latch hanger 119 enters the groove in 120 and provides means for holding the key in its depressed position. The device provides a very simple means of preventing two keys from being depressed at the same time. The end of the key depresses a relay arm 122 of switch 124, which in turn closes that particular circuit. When another key is depressed, the first action that takes place is that the cone part 112 engages the detent bar 119. This provides means for releasing any other key that is engaged with a relay and locked down; thus the engaged key is returned to normal position by spring 108 permitting the newly depressed key to wedge between another pair of adjacent balls in line with all the keys. The slack is again taken up in the row of balls, thus preventing more than one key being operated at one time. When the new key reaches the bottom of its stroke, the detent plate will again engage the groove 120 provided in the shaft of the key.

*Method of operation*

The operation of the shuttle-lift is best described by following the normal procedure in its use. An automobile is driven to the parking lot and the owner steps out and locks his car, leaving the car so it can be moved on its own wheels. The operator drives the shuttle-lift into position over the car, moves two front pairs of rollers to adjust them to the wheel base of the car, swings all rollers around the wheels and rolls the car into a parking position without lifting it. In case the parking lot is nearly filled but a few spaces remain open, the procedure is the same as just described except that the car is lifted by all of its wheels up through the main frame of the shuttle-lift and is then transported over the tops of the other cars and lowered into the vacant parking place.

Cars are parked in uniformly spaced rows. The shuttle-lift is provided with four wheels set at right angles to the main wheels. These wheels are normally held up off the ground. When it is desired to move the shuttle-lift to another row of cars, the transverse wheels are lowered sufficiently to contact the ground or transverse track and will result in lifting the entire shuttle-lift off the regular wheels. Any further travel will be on these wheels in a transverse direction.

It is believed that it will be clearly apparent from the above description and the disclosure in the drawings that the invention comprehends a novel construction of a shuttle-lift device for use in parking automobiles.

Having thus disclosed the invention, I claim:

1. A shuttle-lift automobile parking device, comprising: a rectangular framework of box type cross section, having an enclosed open area large enough to permit passing an automobile therethrough; a downwardly extending supporting leg disposed adjacent each corner of said framework and secured thereto; a main transport and supporting wheel resiliently secured to each of said legs and disposed to move said framework longitudinally; an auxiliary wheel secured to each of said legs and having means for operatively engaging said wheels to move said framework transversely; reversible power means for driving said main supporting wheels and said auxiliary wheels; coacting pairs of rollers, one pair for each wheel of an automobile, adapted to engage the tires of an automobile to move the same; means for pivoting said rollers, outside of the downward projection of an automobile, and to swing them in the horizontal plane to admit an automobile into said shuttle-lift parking device and to cause said rollers to engage the tires of an automobile; means for adjusting said rollers longitudinally of said framework to adapt them to automobiles of various wheel base lengths; means for simultaneously raising and lowering the four pairs of coacting rollers to raise or lower an automobile; and an interlocking electrical control means for said parking device.

2. The subject matter of claim 1 in which the means for pivoting said rollers comprises: a lower carriage for supporting said rollers; a fluid cylinder and an axially aligned guide cylinder fixedly secured to each roller supporting the lower carriage; a double acting piston disposed for reciprocation in said fluid cylinder and having a hollow quill portion extending downwardly into said guide cylinder; a cross-head at the lower end of said quill portion having a follower roller revolvably secured to the vertical face thereof; a cam groove in the wall of said guide cylinder adapted to operatively engage said roller to produce a 90 degree rotary movement to said piston and quill; a vertical, driven shaft, slidably mounted in said quill and said shaft and said quill having keying means to insure their turning together; a roller spindle secured, at right angles, to the lower end of said driven shaft; bearings mounted on said spindle and a roller tube mounted for revolution on said bearings.

3. The subject matter of claim 1 in which the means for adjusting said rollers longitudinally of said framework comprises: an upper carriage disposed for movement longitudinally of said framework by power means and having two spaced upper elevator cable sheaves revolvably mounted thereon; spaced vertical guides secured to the upper carriage and guided at their lower ends by rolls disposed to engage the lower frame of the shuttle-lift device; a lower carriage slidably disposed on said vertical guides and having a pair of said automobile wheel engaging rollers, their positioning and actuating means and a vertically movable cable sheave mounted thereon; an elevator cable secured at one end to the framework of the device, passing over one of the upper cable sheaves, then downwardly around the movable cable sheave, then upwardly over the second upper sheave and finally to a cable drum driven by an elevator electric motor; guide sheaves disposed to engage said vertical guide on opposite sides and bracket means secured to said lower carriage and adapted to revolvably support said guide sheaves.

4. The subject matter of claim 1 in which the interlocking electrical control means, comprises: a control box having a plurality of push buttons on its upper face and a three position control lever on one side thereof, said control lever having a central off position and a forward and reverse position on each side thereof, said lever being spring biased to require holding in the forward or reverse position and to return to the off position when released; a ball track having one more ball than there are push buttons and with sufficient additional space to accommodate the body portion of one push button, means for securing a push button in its depressed position; means for releasing a button previously locked down when a new button is pressed and a switch for each push button adapted to control one essential electrical control circuit.

5. A shuttle-lift automobile parking device, comprising: a rectangular framework framing an open area large enough to permit passing an automobile therethrough; a downwardly extending supporting leg disposed adjacent each corner of said framework and secured thereto; a main transport and supporting wheel secured to each of said legs and disposed to move said framework longitudinally; an auxiliary wheel secured to each of said legs and having means for operatively engaging said wheels to move said framework transversely; power means for driving said main supporting wheels and said auxiliary wheels; coacting pairs of rollers, one pair for each wheel of an automobile, adapted to engage the tires of an automobile to move the same; means for pivoting said rollers and to swing them in the horizontal plane to admit an automobile into said shuttle-lift parking device and to cause them to both engage the tires of an automobile below the horizontal plane including the wheel axle; means for adjusting said rollers longitudinally of said framework to adapt them to automobiles of various wheel bases; means for raising and lowering the four pairs of coacting rollers to raise or lower an automobile; and an electrical control means for said parking device.

6. The subject matter of claim 5 in which the operative means for said auxiliary wheels comprises: axle supporting means for each wheel; a fluid cylinder secured one to each leg, a piston secured to each of said axle supporting means and operatively disposed for reciprocation in said cylinders, adapted to raise and lower said wheels; a propulsion motor for each wheel and gear reduction means operatively coupling said motors to said wheels; means for supplying fluid under pressure to each cylinder and a unit means for controlling the fluid supply and power supply to said motor.

References Cited in the file of this patent

UNITED STATES PATENTS

| | | |
|---|---|---|
| 1,757,798 | Grab | May 6, 1930 |
| 2,629,507 | Olson | Feb. 24, 1953 |